United States Patent
Bodre et al.

[15] 3,663,263
[45] May 16, 1972

[54] METHOD OF PREPARING CHROMATOGRAPHIC COLUMNS

[72] Inventors: Robert J. Bodre; Kirby Allan Pinkerton, both of Texas City, Tex.

[73] Assignee: Monsanto Company, St. Louis, Mo.

[22] Filed: Apr. 3, 1969

[21] Appl. No.: 813,144

[52] U.S. Cl. ................. 117/63, 117/95, 117/119.6, 117/161 UT, 55/386, 210/31 C, 210/198 C
[51] Int. Cl. .................................................. C01n 31/08
[58] Field of Search ............. 117/62, 63, 95; 55/67, 197, 55/386; 210/31, 31 C, 198 C

[56] References Cited

UNITED STATES PATENTS

| | | | |
|---|---|---|---|
| 3,547,684 | 12/1970 | Hollis et al. | 55/67 |
| 3,295,296 | 11/1967 | Halasz et al. | 55/67 |
| 3,322,695 | 5/1967 | Alfrey et al. | 260/31.2 R |
| 3,357,158 | 12/1967 | Hollis | 55/67 |
| 3,347,020 | 10/1967 | Van Venrooy | 55/386 |
| 3,407,573 | 10/1968 | Crowley | 55/386 |
| 3,422,605 | 1/1969 | Crowley | 55/386 |
| 3,514,925 | 6/1970 | Bossart | 55/386 |
| 2,920,478 | 1/1960 | Golay | 55/197 |
| 3,298,925 | 1/1967 | Mosbach | 210/198 C |
| 3,376,694 | 4/1968 | Owens et al. | 55/67 |
| 3,387,710 | 6/1968 | Pogacar | 210/198 C |
| 3,493,497 | 2/1970 | Pretorius et al. | 210/198 C |
| 3,418,152 | 12/1968 | Staudenmayer et al. | 117/63 |
| 3,517,483 | 6/1970 | Carmichael | 55/67 |

Primary Examiner—William D. Martin
Assistant Examiner—M. Sofocleous
Attorney—C. James Bushman, Elizabeth F. Sporar and M. N. Cheairs

[57] ABSTRACT

A method of preparing chromatographic columns of the Golay type having substrates of porous polymeric materials which comprises coating the inside surface of a tubular member with a mixture comprising one or more polymerizable monomers, at least one of which is a polyvinyl monomer, and a solvent which is miscible but nonreactive with said monomer, polymerizing the monomer or monomers and removing any unreacted components.

16 Claims, 1 Drawing Figure

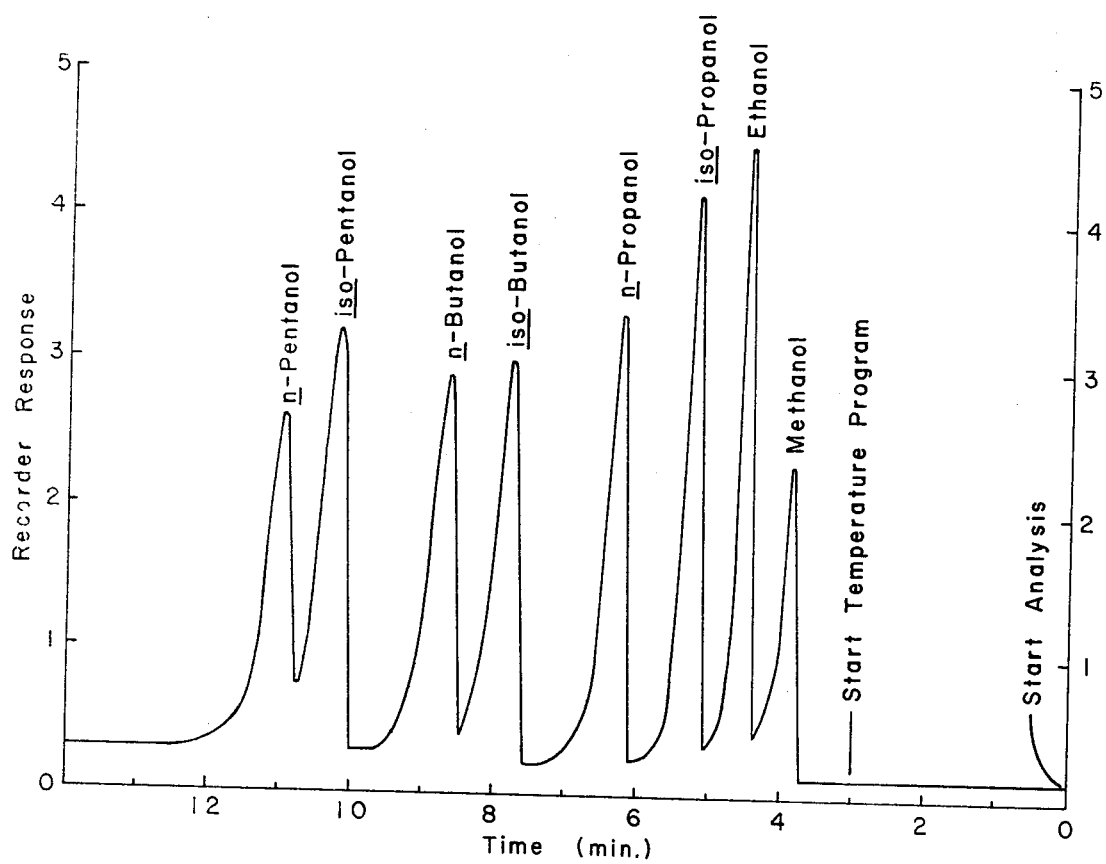

METHOD OF PREPARING CHROMATOGRAPHIC COLUMNS

BACKGROUND OF THE INVENTION

The present invention relates to separation columns for use in chromatography. More particularly, the present invention relates to a method for the preparation of porous packed chromatographic columns of the Golay type. The practice of gas chromatography is well known and extensively used. Briefly, the technique involves passing a fluid sample, generally in the gaseous state, through a chromatographic column either with or without the aid of an inert carrier gas, the components of the sample being separated into chromatographic fractions based on the different absorptive affinities of the sample component in or with a liquid or solid. The chromatographic separation column can be of various types depending upon the sample being analyzed, the type of separation desired, etc. Generally, the separation columns comprise tubular conduits packed with the substrate.

The use of capillary columns, particularly of the Golay type, has found widespread use because of the fact that the columns give markedly better resolution than larger diameter columns. Furthermore, conventional columns in which a porous polymeric material in the form of a gel, powder or bead is used as a substrate, have been found to be useful in separating compounds from water. Unfortunately, because of the extremely small diameter of capillary columns, i.e., Golay columns, it is virtually impossible by ordinary techniques to pack such columns with porous polymeric substrates and thus obtain the advantages of such porous substrates in small diameter columns. Moreover, because of the fact that very small diameter particles of the porous polymers must be used to obtain maximum separating efficiency, even non-capillary columns have a tendency to severely pack with the result that very high carrier gas pressures are needed to obtain reasonable flow rates through the column.

SUMMARY OF THE INVENTION

It is, therefore, an object of the present invention to provide a new and improved method for the preparation of gas chromatographic separating columns.

It is a further object of the present invention to provide a method for preparing gas chromatographic capillary columns having a substrate comprised of a porous material.

Still a further object of the present invention is to provide new and improved gas chromatographic columns.

These and other objects of the present invention which will be apparent from the description given herein and the appended claims can be accomplished by a method of preparing chromatographic columns comprising coating the inside surface of a tubular member with a mixture comprising at least 10 percent by weight of at least one liquid polyvinyl monomer and a solvent, said solvent being miscible and non-reactive with said monomer, polymerizing said monomer, and removing any unreacted components from said member.

In a more preferred embodiment, the tubular member is filled with water after the inside surface thereof has been coated but prior to polymerizing the monomer.

In an even more preferred embodiment, the mixture contains in addition at least one monoethylenically unsaturated monomer copolymerizable with the polyvinyl monomer.

DESCRIPTION OF THE PREFERRED EMBODIMENTS

By the use of the present invention, it is possible to effect in situ preparation of the substrate thus avoiding the necessity for having to pack the column with a solid particulated matter. The substrate produced by the method herein are of the microporous type. Such substrates are generally comprised of cross-linked insoluble organic polymers.

In preparing the columns of the instant invention, a mixture of a suitable monomer and solvent and preferably a free-radical catalyst is first used to coat the inside of the tubular member which is to be used as the column. As used herein, the terms monomer and solvent are intended to include not only a single monomer or a single solvent but a mixture of monomers or solvents, respectively. Generally speaking, the tubular member will have an internal diameter of from about 0.25 to about 2.00 mm. It is to be understood, however, that the method can be applied to the preparation of columns having large diameters if desired. The length will, of course, depend on the type of separation desired and is, therefore, completely a matter of choice. The column length can, for example, range from several feet to 1,000 feet and longer, columns from 2 to 300 feet, however, being generally preferred.

The polymerizable mixture containing the solvent, the monomers and the catalyst, if used, can be pulled through the tubular member by means of suction, allowed to flow through the column by gravity or forced through with pressure using an inert gas. Once the inside surface of the tubular member has been completely coated, it is desirable to flow an inert gas such as helium, argon or nitrogen through the tubular member for 10–15 minutes in order to insure that no plugs are present and to remove oxygen. Following this, the tubular member is sealed off and the polymerization process begun.

Polymerization of the monomer can be effected by various methods depending on the material of construction of the tubular member. For example, if the tubular member is glass, it can be irradiated with ultraviolet or other forms of radiation such as gamma rays to cause polymerization. Generally, however, the tubular member is metallic in nature and, therefore, polymerization by radiation techniques is not employed. A more preferable means of polymerization is thermal polymerization. When the latter technique is employed, the heating can be accomplished in any suitable manner as, for instance, in a chromatographic oven at temperatures of from $50° - 220°$ C. In an especially preferred embodiment, polymerization is effected using a free-radical catalyst at a temperature of from $50° - 130°$ C depending on the particular monomer or monomers present and the catalyst chosen. Regardless of the technique employed, when the polymerization reaction is complete, the tubular member is unsealed and any unreacted components e.g., solvent, unreacted monomer, catalyst, etc., are removed, generally by suction.

In a more preferred embodiment of the present invention, it has been found desirable to choose a solvent which is not only miscible and unreactive with the monomer but which is also immiscible with water and to fill the tubular member with water after the coating step but prior to polymerization. This technique helps in preventing the formation of any plugs of polymer in the column.

While not absolutely necessary, it has been found preferable following removal of the water, if used, and solvent to wash the column by passing through it a suitable liquid washing agent having the characteristics of being miscible with both water and the solvent, more volatile than the solvent and substantially a non-solvent for the polymer which has been formed. Washing agents which are useful include lower alcohols having from one to four carbon atoms such as methanol, ethanol and propanol and lower ketones having up to five carbon atoms such as acetone, methyl ethyl ketone and the like. As will be obvious to those skilled in the art, the washing liquid chosen will depend upon the particular polymer or copolymer which has been prepared in the tubular member and the solvent used.

Prior to use in a chromatographic analysis, the column is generally conditioned or pre-treated by passing an inert gas through it at an elevated temperature as, for example, $150°$ to $200°$ C, for several hours. The pre-treatment of the column removes any volatile materials which may remain and which would interfere with subsequent analysis using the column.

Columns produced in this fashion have substrates of microporous, cross-linked polymers which are ideally suited for use in the separation of a host of different compounds. The porous polymeric substrates prepared herein are cross-linked in order that they be thermally stable. To obtain these cross-linked polymers, it is necessary that at least one of the monomers chosen be of the polyfunctional, i.e., polyvinyl, type. For example, a homopolymer produced from divinylbenzene will be a highly cross-linked material. Numerous other polyvinyl or polyfunctional type monomers can be employed in the method of the instant invention. Non-limiting examples include divinylbenzene, divinylxylene, divinylethylbenzene, trivinylbenzene and the like; polyvinyl or polyallyl ethers of glycol, of glycerol, of pentaerythritol, or mono- or dithio-derivatives of glycols and of resorcinol; divinyl pyridine, diallyl pyridine, diallyl phthalate, ethylene glycol diacrylate, ethylene glycol dimethacrylate, 1,3-butanediol dimethacrylate, divinylsulfone, divinyl ketone, allyl acrylate, diallyl maleate, diallyl fumarate, diallyl succinate, diallyl carbonate, diallyl malonate, diallyl oxalate, diallyl adipate, diallyl sebacate, divinylsebacate, diallyl tartrate, N,N'-ethylenediacrylamide, N,N'-methylenedimethacrylamide and the like.

Particularly preferred polyvinyl monomers include the following: heterocyclic polyvinyl aromatic hydrocarbons such as divinyl pyridine; monocyclic polyvinyl aromatic hydrocarbons such as divinylbenzene and trivinylbenzene, glycol dimethacrylates such as ethylene glycol dimethacrylate; and polyvinyl ethers of polyhydric alcohols such as divinoxyethane and trivinoxypropane. Especially preferred as polyvinyl monomers are the monocyclic polyvinyl aromatic hydrocarbons, particularly the monocyclic divinyl aromatic hydrocarbons. The above monomers can be used alone or in mixtures. It is necessary that the coating mixture contain at least 10 percent by weight of the polyvinyl monomer. Preferably, however, the polyvinyl monomer will be present in the mixture in amounts of from 20 to 80 percent by weight.

In a more preferred embodiment of the present invention, there is employed along with the above polyvinyl monomer or monomers one or more monoethylenically unsaturated monomers which are copolymerizable with the polyvinyl monomer. Included in this latter group may be mentioned acrylic acid, methacrylic acid, methyl acrylate, ethyl acrylate, propyl acrylate, isopropyl acrylate, butyl acrylate, tert-butyl acrylate, ethylhexyl acrylate, cyclohexyl acrylate, isobornyl acrylate, benzyl acrylate, phenyl acrylate, alkylphenyl acrylate, ethoxymethyl acrylate, ethoxyethyl acrylate, ethoxypropyl acrylate, propoxypropyl acrylate, propoxymethyl acrylate, propoxyethyl acrylate, ethoxyphenyl acrylate, ethoxybenzyl acrylate, ethoxycyclohexyl acrylate, and the corresponding esters of methacrylic acid; styrene, ethylvinylbenzene, vinyltoluene, vinylnaphthalene, and similar monovinyl aromatic hydrocarbons; vinyl esters of carboxylic acids such as vinyl acetate, vinyl propionate and the like.

Another class of suitable monoethylenically unsaturated monomers include the monovinyl nitrogen heterocyclic compounds such as vinylpyridine, 2-methyl-5-vinylpyridine, 2-ethyl-5-vinylpyridine, 3-methyl-5-vinylpyridine, 2,3-dimethyl-5-vinylpyridine, and 2-methyl-3-ethyl-5-vinylpyridine, 2-methyl-5-vinylquinoline, 4-methyl-4-vinylquinoline, 1-methyl- or 3-methyl-5-vinylisoquinoline, N-vinylcaprolactam and N-vinylbutyrolactam. Especially preferred monoethylenically unsaturated monomers are the monocyclic monovinyl aromatic hydrocarbons such as styrene, ethylvinylbenzene and the like and the monovinyl nitrogen hetercyclic compounds such as vinylpyridine and the like. As in the case of the polyvinyl monomers, the above monomers can be used alone or in mixtures. When a monoethylenically unsaturated monomer is used, it is usually present in the mixture in an amount such that the ratio of the weight of the monoethylenically unsaturated monomer to the weight of the polyvinyl monomer is from 1:9 to 9:1 and more preferably from 1:3 to 3:1.

In carrying out the method of the present invention, the solvent employed will be one which is miscible with the monomers but possesses limited solubility for any polymer, either homopolymer or copolymer that is produced. Furthermore, the solvent employed must be non-reactive with the monomers. The particular solvent chosen is a matter of choice provided the above characteristics are met. Obviously, any number of solvents are usable depending upon the particular monomers which are being used and the desired porosity, i.e., the size of the pores and the density of the polymer, the latter characteristics being dependent to some extent upon the kind of solvent employed. Solvents generally employed include liquid aromatic hydrocarbons such as benzene, toluene, xylenes, ethylbenzenes, and the like; higher aliphatic hydrocarbons such as hexane, heptane, iso-octane, octane, and the like; higher alcohols such as isoamyl alcohol, hexanol, iso-butyl alcohol, tert-butyl alcohol and the like; nitrohydrocarbons; and higher alkyl esters of organic acids and mixtures thereof. The solvent, which as stated includes not only a single compound but mixtures containing two or more compounds, is characterized by its substantial insolubility in water. The solvent will usually be present in an amount ranging from about 0.5 to about 20 and more preferably one to five times the weight of the monomer or monomers employed.

When a catalyst is employed in the method of the instant invention, it can be any of the well known free-radical type. Non-limiting examples include peroxygen-type compounds, alkyl hydroperoxides, diperoxy dicarbonate esters, azo-type compounds and the like. Particularly suitable are peroxides such as benzoyl peroxide, tert-butyl peroxide and the like. The catalyst will generally be employed in an amount ranging from 0.01 to 3 percent and preferably 0.2 to 1.3 percent by weight based on the total weight of the monomer or monomers present. It is to be understood, however, that it is not necessary to employ a catalyst inasmuch as the polymerization can be carried out thermally without the aid of any initiator. Preferably, however, a catalyst such as the above will be employed to accelerate the polymerization.

The following examples will serve to more fully illustrate the instant invention but are not to be construed as limitations on its scope.

EXAMPLE 1

A solution was prepared containing the following percentages of ingredients by weight: 11 percent divinylbenzene, 9 percent ethylvinylbenzene, 20 percent styrene, 20 percent isobutyl alcohol, 39 percent dodecyl alcohol and 1 percent benzoyl peroxide. A 100 ft. section of copper tubing having an internal diameter of 0.5 mm was coated on the inside with the above mixture by forcing the mixture through under pressure. When the mixture had passed through the tube, a nitrogen purge was placed on one end and allowed to sweep through the tube for around 10 – 15 minutes. The tube was then filled with water using pressure to effect the filling and both ends of the capillary sealed with tubing caps. The filled tube was placed in any oven, and the temperature slowly raised to 90° C and maintained at this temperature for a period of around 16 hours. After cooling to room temperature, the caps were removed from the tubing and a nitrogen purge was again applied to force out the remaining solvent and inert liquid. Following this, the tube was washed with around 50 cc of methanol, drained and a nitrogen purge was again placed on the tubing for several minutes until the remaining methanol had been removed.

The column thus produced was used to separate a mixture of $C_1$ to $C_5$ alcohols. A Varian Aerograph Model 204 gas chromatograph having a hydrogen flame detector was employed. The carrier gas used was helium at a flow rate of 7.8 ml/min. and a column pressure of 6 psig. The temperature of the column was kept at 85° C for 3 minutes after the start of the analysis after which it was programmed to increase at a 12° C/min. rate until a final temperature of 200° C was reached. FIG. 1 shows the results of the alcohol analysis.

EXAMPLE 2

A solution was prepared containing the following percentages of components by weight: 11 percent divinylbenzene, 9 percent ethylvinylbenzene, 20 percent styrene, 44 percent dodecane, 15 percent toluene and 1 percent benzoyl peroxide. A chromatographic column was prepared using the procedure employed in Example 1.

EXAMPLE 3

A mixture containing 11 percent divinylbenzene, 9 percent ethylvinylbenzene, 20 percent styrene, 59 percent isobutyl alcohol and 1 percent benzoyl peroxide is used as per the procedure of Example 1 to prepare a chromatographic column.

EXAMPLE 4

A mixture containing 11 percent divinylbenzene, 9 percent ethylvinylbenzene, 20 percent styrene, 59 percent isoamyl alcohol and 1 percent benzoyl peroxide is employed as per the procedure of Example 1 to prepare a chromatographic column.

EXAMPLE 5

A solution containing 11 percent divinylbenzene, 9 percent ethylvinylbenzene, 20 percent styrene, 20 percent amyl alcohol, 39 percent butyl alcohol and 1 percent benzoyl peroxide is used to prepare a chromatographic column as per the procedure of Example 1.

EXAMPLE 6

A solution containing 11 percent divinylbenzene, 9 percent ethylvinylbenzene, 20 percent styrene, 59 percent dodecyl alcohol and 1 percent benzoyl peroxide is used to prepare a chromatographic column by the procedure of Example 1.

EXAMPLE 7

A mixture of 11 percent divinylbenzene, 9 percent ethylvinylbenzene, 20 percent styrene, 20 percent dodecyl alcohol, 39 percent butyl alcohol and 1 percent benzoyl peroxide is used to prepare a chromatographic column using the procedure of Example 1.

The columns of Examples 2–7 following conditioning, are also used in the chromatographic separation of a sample containing $C_1$-$C_5$ alcohols and found to work quite satisfactorily. The columns are also found to be very effective in the separation of the organic chlorides, organic acids, ketones and esters, giving excellent resolution between the various peaks.

What is claimed is:

1. A method of preparing chromatographic columns comprising:
   coating the inside surface of a tubular member with a mixture comprising at least 10 percent by weight of at least one liquid polyvinyl monomer and a solvent, said solvent being miscible and non-reactive with said monomer and being immiscible with water;
   substantially filling said tubular member with water;
   thereafter polymerizing said monomer in the filled coated tubular member; and
   thereafter removing the water and any unreacted components from said member.

2. The method of claim 1 wherein said polyvinyl monomer is selected from the group consisting of monocyclic polyvinyl aromatic hydrocarbons, heterocyclic polyvinyl aromatic hydrocarbons, polyvinyl ethers of polyhydric alcohols, glycol dimethacrylates and mixtures thereof.

3. The method of claim 2 wherein said mixture contains a free-radical catalyst.

4. The method of claim 3 wherein said polymerizing is carried out by heating said member to a temperature of from 50° to 130°C.

5. The method of claim 4 wherein a liquid washing agent is passed monocyclic said member after said water and said solvent have been removed, said agent being miscible with said solvent and said water, more volatile than said solvent and a non-solvent for the polymer formed.

6. The method of claim 5 wherein said polyvinyl monomer is a moncyclic divinyl aromatic hydrocarbon.

7. The method of claim 1 wherein said mixture contains in addition at least one liquid monoethylenically unsaturated monomer copolymerizable with said polyvinyl monomer, the ratio of the weight of said monoethylenically unsaturated monomer to the weight of said polyvinyl monomer being from 1:9 to 9:1.

8. The method of claim 7 wherein said monoethylenically unsaturated monomer is selected from the group consisting of monocyclic monovinyl aromatic hydrocarbons, monovinyl nitrogen heterocyclic compounds and mixtures thereof.

9. The method of claim 8 wherein said mixture contains a free-radical catalyst.

10. The method of claim 9 wherein said polymerizing is carried out by heating said member to a temperature of from 50° to 130°C.

11. The method of claim 10 wherein said polyvinyl monomer is a monocyclic divinyl aromatic hydrocarbon.

12. The method of claim 11 wherein said monoethylenically unsaturated monomer is a monocyclic monovinyl aromatic hydrocarbon.

13. The method of claim 12 wherein said monocyclic divinyl aromatic hydrocarbon is divinylbenzene.

14. The method of claim 13 wherein said monocyclic monovinyl aromatic hydrocarbon is styrene.

15. The method of claim 13 wherein said monocyclic monovinyl aromatic hydrocarbon is ethylvinylbenzene.

16. The method of claim 13 wherein said monocyclic monovinyl aromatic hydrocarbon is a mixture of ethylvinylbenzene and styrene.

* * * * *